Aug. 30, 1932.  W. B. LANG  1,874,197
INNER TUBE FOR PNEUMATIC TIRES
Filed Feb. 7, 1930
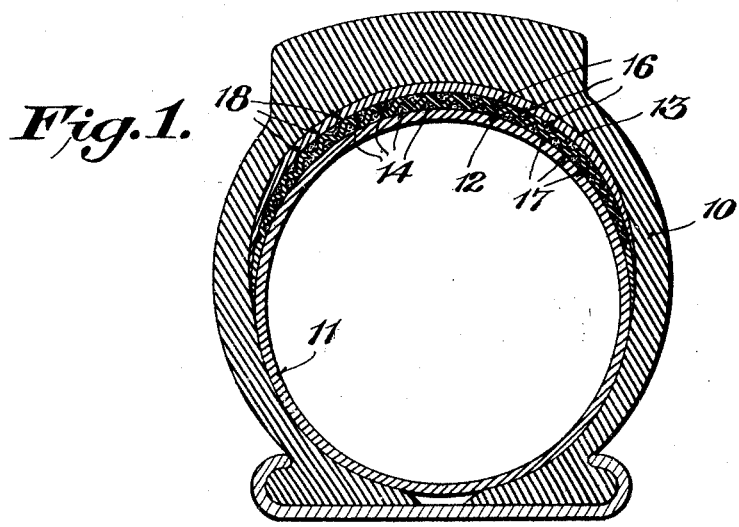
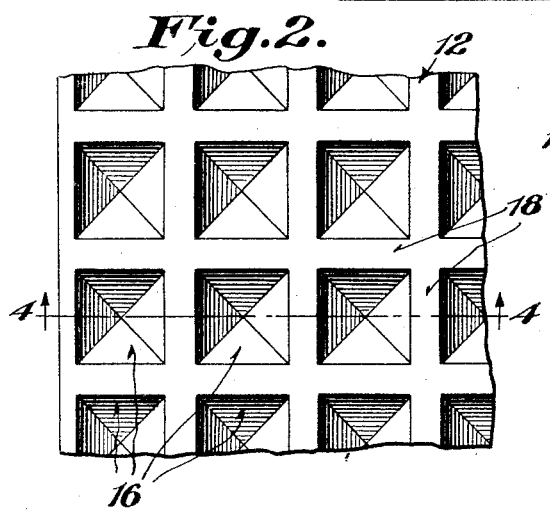
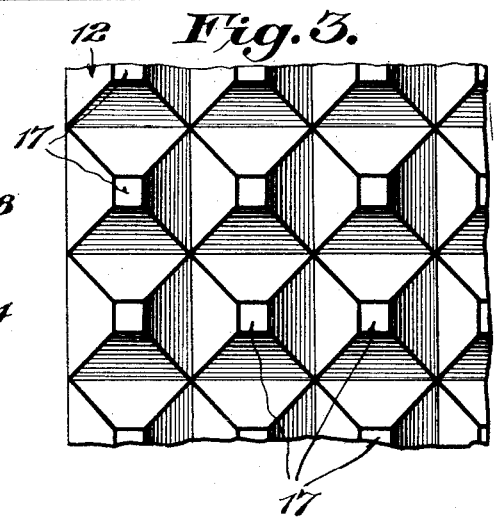
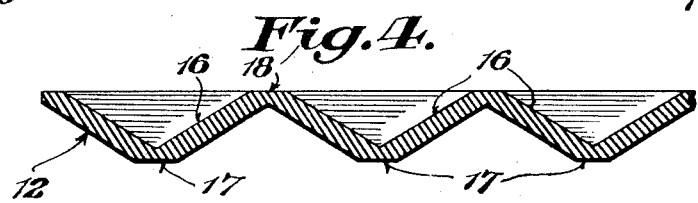
Inventor
Walter B. Lang,
By Steward & McKay
his Attorneys Patented Aug. 30, 1932

1,874,197

UNITED STATES PATENT OFFICE

WALTER B. LANG, OF ROSWELL, NEW MEXICO,

INNER TUBE FOR PNEUMATIC TIRES

Application filed February 7, 1930. Serial No. 426,647.

This invention relates to inner tubes for pneumatic tires of the general type which are provided with a semi-fluid of plastic self-sealing composition which in the case of a puncture enters the aperture, forming a plug, or otherwise closes the aperture, preventing the escape of air from the tube and consequent deflation of the tire.

It has been proposed to form inner tubes of this type having a single sheet or strip of raw unvulcanized gum rubber arranged between two vulcanized rubber layers along the tread portion of the inner tube. I have found, however, that the gum rubber being of semi-solid to plastic consistency tends to flow from one part to another, resulting in excess of such material in one place and none in another. The latter places are then without any of the desired protection against deflation by punctures. As the sealing composition must possess ability to flow under pressure if it is to possess puncture sealing properties this difficulty cannot well be avoided by reducing the plasticity or fluidity of the puncture sealing material.

The principal object of the present invention is to provide means for retaining the puncture sealing material in position so that whatever part of the tread portion of the tire is punctured there is certain to be sufficient puncture sealing material at that point to close the aperture, if the aperture is not excessively large.

This object is attained in the present case by making it impossible for pressure on the tube to produce a substantial displacement of sealing composition from one part to another. One method by which this result may be accomplished is by forming that portion of the inner tube adjacent the tread of the outer tire, hereinafter referred to as the tread portion of the tube, with double zones or walls of vulcanized rubber with an intervening zone or filler of fixed cellular material contacting on both sides with the material in said double zones or walls and filled with sealing material, thereby avoiding substantial displacement of the puncture sealing material when the tube is subjected to pressure.

The invention is capable of embodiment in various specific forms. In one form of construction the sealing composition is confined in separate, non-connected cells or pockets, thereby making flow of such material from one cell to any other cell physically impossible. In another form of construction the tread portion of the tube is formed with double walls, spaced apart a fixed distance by any suitable means, leaving spaces between and around such spacing means for the sealing composition. Such spacing means prevent the double walls being forced together with simultaneous expulsion of the sealing composition, without subdividing the latter into wholly unconnected separate portions. It will be understood that the terms cellular material, cellular zone or similar terms as used in this specification or claims include those constructions in which the sealing composition is only partially separated by such spacing means as well as those constructions in which the sealing material is confined in separate, non-connected cells or pockets.

A combination of these two forms of construction is shown, by way of example, in the accompanying drawing, wherein:

Figure 1 is a transverse section through a tire provided with an inner tube constructed in accordance with the present invention.

Figure 2 is a top view of the intermediate cell forming strip of the inner tube.

Figure 3 is a bottom view of the same.

Figure 4 is a section on the line 4—4 of Figure 2.

As shown, 10 represents the outer tire and 11 the inner tube. In the particular embodiment illustrated the inner tube is built up of four elements, first, the inner tube proper 11, second, an intermediate cell forming strip 12, third, a filling of puncture sealing composition 14 and, fourth, a cover strip 13. Of these elements all except the puncture sealing composition are conveniently formed of vulcanized rubber, the vulcanization being accomplished, either wholly or in part, after the elements are all assembled to produce a unitary article.

The sides of the cell forming strip are thinned out or tapered towards the margins of the strip so that, when the latter has been placed in position, the upper surface of the strip is substantially a continuation of the outer surface of the inner tube proper. This construction allows the cover strip to overlap smoothly the edges of the cell forming strip and be united to the sides of the inner tube.

The construction of the cell forming strip is shown more particularly in Figures 2, 3 and 4. On its top side (Fig. 2) the strip is formed with regular rows of pyramidically shaped depressions 16, separated by ridges 18. On the bottom there are corresponding rows of pyramidical projections 17. The strip may conveniently be formed by molding a piece of vulcanized rubber into the form shown. After the strip has been formed the depressions 16 and the spaces between and around the apices of the projections 17 are filled with plastic gum rubber. The filled out strip is then laid on the part 11 of the inner tube, the cover strip 13 is then applied and the whole heated under pressure to vulcanize the apices of the projections 17 to the part 11, the ridges 18 between the depressions 16 to the cover strip 13, and the margins of the latter to the sides of the inner tube.

In the inner tube so constructed there are, on the upper side of the strip 12, a series of wholly unconnected pockets filled with plastic gum rubber. On the other side, there is only a partial subdivision into separate individual cells. In the latter case, however, any substantial flow of the plastic gum rubber from one part of the tube to another is avoided by the spacing action of the projections 17. which prevents the gum rubber on the underside of the strip 12 being squeezed out at any one part.

The arrangement above described has the advantage that no part of the tread of the inner tube may be punctured by a nail or the like without such nail passing through a portion of the puncture sealing composition, either on top or below the strip 12 or both simultaneously. This is due, of course, to the fact that the apices of the projections 17 on the underside of the strip 12 are staggered with respect to the ridges 18 between depressions on the top side of the strip, so that the pockets containing the sealing composition overlap.

Numerous changes in construction may be made without departing from the spirit of my invention.

What is claimed is:

1. An inner tube for pneumatic tires having adjacent the tire tread double walls consisting chiefly of vulcanized rubber with an intervening filler comprising a single cell-forming undulatory strip of material contacting on both sides with said walls, said strip providing cells which are filled with puncture sealing material, thereby avoiding substantial displacement of the puncture sealing material when the tube is subjected to pressure.

2. An inner tube as in claim 1 in which the cell-forming strip comprising a strip of vulcanized rubber having a series of recesses formed on one surface thereof to form pockets to receive puncture sealing material.

3. An inner tube as in claim 1 in which the cell-forming strip comprises a strip of vulcanized rubber having a series of recesses formed on and covering the major portion of both surfaces, the recesses on one surface being staggered with respect to the recesses on the other surface so as to form overlapping pockets for the puncture sealing material so that the tread portion cannot be punctured without piercing one or other of said pockets.

4. An inner tube for pneumatic tires having in the portion adjacent the tire tread a series of recesses completely filled with puncture sealing materials, said recesses being formed on both sides of a single piece of undulatory sheet material.

5. An inner tube as in claim 4 in which the recesses on one side are separate and not connected to each other.

6. An inner tube as in claim 4 in which the recesses overlap each other so that the tread portion cannot be punctured without piercing one or other of said recesses.

7. An inner tube for pneumatic tires as in claim 4 in which the recesses on one side form pyramidical pockets, the walls of which form complementary recesses on the other side of the undulatory sheet material.

In testimony whereof I hereunto affix my signature.

WALTER B. LANG.